Dec. 13, 1960

R. S. ESTEY 2,963,973

GYRO OPTICAL SYSTEM

Filed March 26, 1953

INVENTOR.
ROGER S. ESTEY
BY
ATTORNEYS

Dec. 13, 1960  R. S. ESTEY  2,963,973
GYRO OPTICAL SYSTEM

Filed March 26, 1953  2 Sheets-Sheet 2

INVENTOR.
ROGER S. ESTEY
BY
ATTORNEYS

United States Patent Office 2,963,973
Patented Dec. 13, 1960

2,963,973

GYRO OPTICAL SYSTEM

Roger S. Estey, North Hollywood, Calif., assignor to the United States of America as represented by the Secretary of the Navy Filed Mar. 26, 1953, Ser. No. 344,914

2 Claims. (Cl. 102—50)

(Granted under Title 35, U.S. Code (1952), sec. 266)

This invention relates to an optical system associated with the gyroscope in a gyroscopically stabilized tracking system adapted to continuously track a source of radiation which may be light, infrared rays, etc. The invention is particularly adaptable for application in a guided missile of the homing type which homes on a source of radiation, the system embodying a gyro stabilized sight line with reference to which the course of the missile is controlled.

The system is of the type wherein the line of sight to the source of radiation to the target is to coincide with the gyro axis, the gyro being precessed in a manner to bring about this coincidence, the line of sight thus being gyro stabilized and the course of the missile being controlled with reference thereto.

The tracking mechanism includes a telescopic device and mirror assembly arranged to focus an image of a target on a photocell or lead sulphide cell, the image being scanned or chopped by a rotating scanning disc in front of the photosensitive cell. This invention provides improvements in the way of a particular manner of incorporating the optical system as a part of the gyro, the inertial properties of the optical system being utilized as the gyro rotor. This constitutes a primary object of the invention.

A further object of the invention is to provide an optical system for the purpose described wherein the optical system carried by the gyro rotor comprises a meniscus lens, a concave mirror and a lens formed as a scanning disc mounted in the focal plane of the optical system so that an image of the target as reflected from the mirror is received thereon.

A further object of the invention is to provide an arrangement wherein the optical system comprises a meniscus lens and concave mirror assembly constructed and mounted essentially to form the gyro rotor and with a radiation responsive element, non-rotatably carried by the gyroscope and axially aligned with the center of the lens and mirror assembly.

Numerous of the advantages and additional objects of the invention will become apparent from the following detailed description and annexed drawings wherein.

Figure 1:
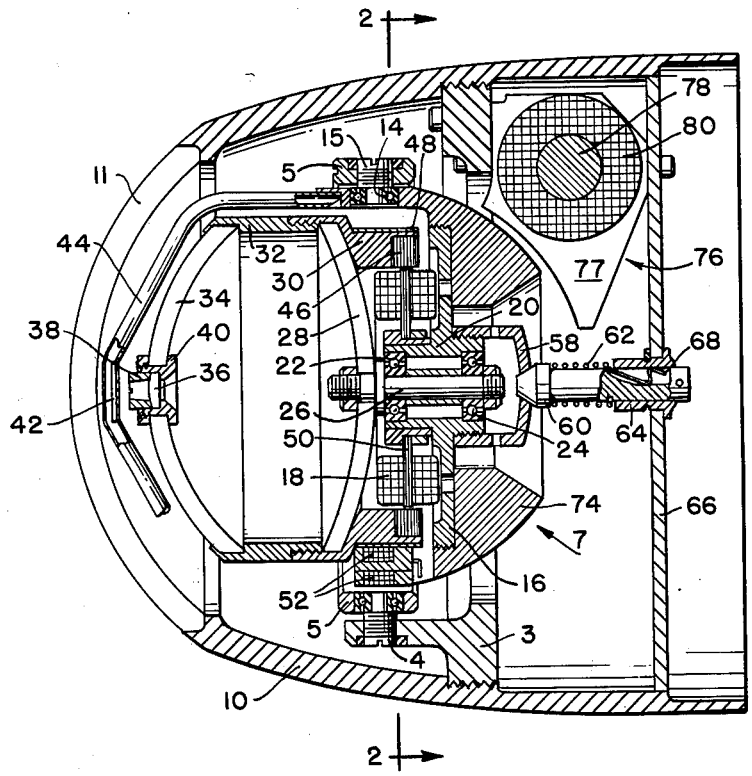
Fig. 1 is a 90 degree cross sectional view of the invention taken along the line 1—1 of Fig. 2.
Figure 2:
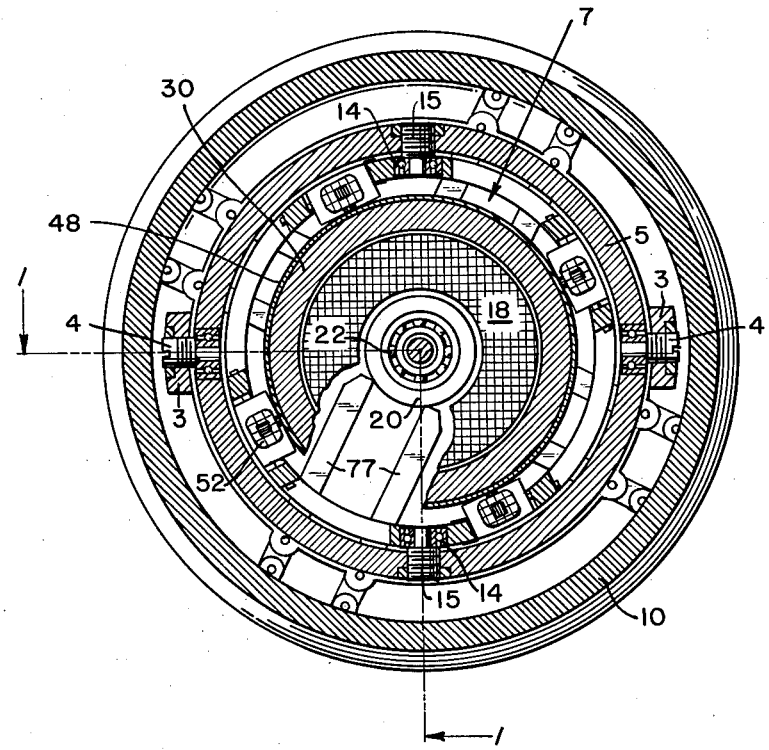
Fig. 2 is a cross sectional view of the invention taken along the line 2—2 of Fig. 1, a portion being broken away.

Referring to Figs. 1 and 2 of the drawings, numeral 10 designates the nose section of a missile in which the invention may be embodied. Section 10 has a curved transparent nose window 11 in the form of a spherical shell through which radiations are received by the optical system. The gyroscopic assembly is carried by a mounting plate 3 which is threaded into the housing 10, as shown. The gyroscopic assembly includes an outer gimbal ring 5 carrying bearings mounted on trunnions 4 carried by the plate 3. Numeral 7 designates the inner gyro frame structure having bearings as shown at 14 journaled on trunnions 15 carried by gimbal ring 5 at points spaced 90° from the trunnions 4. The inner frame structure 7 and the parts which it carries are free to tilt in any direction about a center represented by the intersection of the axes of the trunnion supports and trunnions 4 and 15.

Figure 3:
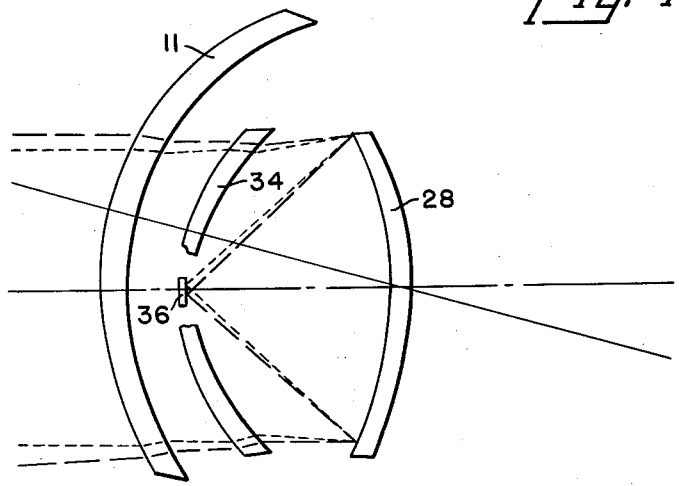
Fig. 3 is a diagrammatic view of the optical system.

Threaded into the gyro frame structure 7 is a support plate 16 which carries motor stator windings 18 and also its central hub 20 carries ball races 22 and 24. Journaled in the ball races is shaft 26 and secured to the forward end of the shaft is concave mirror 28. The periphery of the mirror 28 fits into one part of a two part sleeve designated at 30 and 32, the two parts being threaded together. The part 32 at its outer end carries meniscus corrector lens 34 which is mounted in an annular groove in the part 32. The lens 34 at its center carries field lens 36 and a light funnel 38. The field lens 36 is a scanning disc, as will be described presently. Parts 36 and 38 are mounted in a sleeve 40 in threaded relationship so that they can be adjusted axially to position lens 36 in the focal plane of the system (see Fig. 3).

The flat face of lens 36 has a special scanning pattern including a semi-circular area filled with alternate, transparent and opaque wedge-shaped segments or spokes emanating from the disc center and an adjacent semi-circular area which is arranged to be semi-opaque so as to transmit 50% of the incident radiation. Numeral 42 designates a lead sulphide photocell which is positioned so that radiation passing through the lens 36 and light funnel 38 falls upon the sensitive surface of the cell. The cell is carried by a tubular support member 44 which is attached to the frame structure 7. The signal from the cell will be in the form of a train of pulses due to the chopping action of the scanning disc or lens 36, the resistance of the cell varying in accordance with the amount of light falling on it.

The rear part of the sleeve member 30 carries rotor laminations 46 and a relatively thin cylindrical ring 48 around the outside of the extending part of the member. The ring 48 is made in two semi-cylindrical portions of brass and soft iron respectively, for purposes which will be described presently. The rotor of the system thus comprises the shaft 26, the mirror 28, the sleeve parts 30 and 32, the lens 34 and attached parts. The rotor laminations 46 are adjacent stator laminations 50 associated with the stator windings 18 and the motor thus constituted may preferably be operated from a 400 cycle, 110 volt two phase supply with the rotor being rotated at approximately 3600 r.p.m., for example.

The forward part of the frame structure 7 is notched out to receive four reference coils as designated at 52, these coils being spaced 90° apart. Each of the coils 52 has a laminated C-shaped soft iron core, the coil being wound around the central portion. These coils are supplied with power from a 400 cycle source. The impedance of the coils depends upon whether the brass or steel part of the circular member 48 is adjacent to a particular coil. The output of the coils is a pulsating signal which will have a time phase relationship to the signal generated by the photocell 42 depending upon the direction of departure of the target image from the gyro axis. That is, the train of pulses from the photocell will have a time phase position depending upon the position at which the target image is chopped by the scanning pattern and the pulsating signal from the reference coils 52 provides a reference signal relative to which the time phase position of the signal from the photocell establishes intelligence as to the direction in which the image has departed from the gyro axis. Accordingly, a torque can be applied to the gyro in the proper direction to cause it to precess in a direction to return the target image to the center of the scanning disc, or, in other words, to align the gyro axis with the line of sight to the target. The pulsating signal from the photocell is combined with the signals from the reference coils in a system not shown which is not a part of this invention. The output of this system controls electromagnetic gyro precessing apparatus as will be described.

The central hub of the support plate 16 carries a screw threaded socket 58 which has a central hole in which fits a spring pressed plunger 60 normally urged towards the hole by a spring 62. The plunger 60 is slidably carried by a bushing 64 in a transverse partition 66 in housing 10. The plunger 60, due to its inertia, is moved by setback forces caused by acceleration when the missile is fired and when this happens it is locked in a retracted position by means of a locking spring 68 normally engaged in a channel in the plunger 60, the locking spring having a bent finger portion as shown, which latches over the plunger 60. It can be seen that the plunger 60 normally cages the gyro and upon the missile being fired it uncages the gyro and latches itself in retracted position.

As pointed out in the foregoing, the gyro is automatically precessed in response to signals from the photocell in a manner to track the target or source of radiation, that is, to automatically align its axis with the line of sight to the target. The rear portion of the frame structure 7 comprises a member 74 having a spherical surface as shown formed of soft iron. This portion cooperates with four electromagnets 76, the electromagnets comprising flat end plates 77 having the profile shown presenting a surface adjacent the spherical portion 74 conforming thereto and closely spaced therefrom. The flat end plates are separated by a soft iron core 78 and each have a winding 80. The electromagnets 76 are fastened on one side to the plate 3 and on the other side to the transverse partition 66. In precessing the gyroscope the combined signal from the photocell and the reference coils after amplification is fed differentially into opposite pairs of the electromagnets 76 so that one pair will respond to the "up-down" and the other pair will respond to the "right-left" position of the target image with respect to reference axes of the missile. These reference axes are established by the signals from the reference coils 52 which are carried by the missile itself and the output of which accordingly establish a frame of references. The electromagnets 76 produce a torque acting on the spherical portion 74 which precesses the gyroscope in the proper direction to center the target image on the scanning disc 36. The electrical connection to the cell 42 is through the support member 44 and axially through the trunnion 15 and through a suitable groove in the gimbal ring 5 and another axial hole in the trunnion 4, not shown. The electrical connections to the reference coils 52 and stator windings 18 are disposed in suitable grooves in the gyro structure 7 and the gimbal ring 5.

In operation, radiation from a target, for example a jet plane, passes through nose window 11, a meniscus lens 34 and is focused by the concave mirror 28 onto the plane surface of the lens 36 which has a scanning disc pattern engraved thereon. The nose window 11, meniscus lens 34 and concave mirror 28 together form a lens-mirror system. (See Fig. 3.) The scanning disc scans and chops the target image which is received on the photocell 42, the response of which varies with the amount of light falling upon it with the result that a pulsating voltage signal is derived from the cell. The time phase position of the signal pulses from the cell 42 as described above will establish a position relative to the phase position of the reference signals from the coils 52 depending upon the direction of departure of the target image from the center of the scanning disc. The combined signal from the photo cell and reference coils applied to the appropriate up-down or right-left precessing electromagnets 76 will precess the gyroscope in a direction to realign its axis with the line of sight of the target.

From the foregoing, those skilled in the art will observe that I have provided a gyroscopically stabilized tracking device embodying a telescope or optical system, the elements of which are carried by the rotating part of the gyro and, in fact, constitute the gyro rotor. There results a device which is less bulky, complicated, expensive and difficult to construct, adjust, and maintain.

The foregoing disclosure is representative of a preferred form of my invention and it is intended that the disclosure be interpreted in an illustrative rather than a limiting sense, the scope of the invention being in accordance with the claims annexed hereto.

The invention described herein may be manufactured and used by or for the Government of the United States of America for governmental purposes without the payment of any royalties thereon or therefor.

What is claimed is:

1. A guided missile of the type adapted to home on a source of radiation, comprising, in combination, a missile frame, a transparent dome-shaped window forming a forward end of the missile mounted on said missile frame, a gyroscope having a rotor and gimbals on which to tilt and means for driving said rotor in rotation, said gimbals mounted within the missile on said missile frame and behind said transparent dome-shaped window, said gyroscope mounted within the forward end of the missile supported on said gimbals, the axis of rotation of said gyroscope rotor capable of tilting about the center of said gimbals in all directions relative to the path of movement of the missile, said gyroscope rotor having a lens and mirror system forming a part thereof, said lens and mirror system including a meniscus lens and a concave mirror disposed rearwardly of the meniscus lens, both the meniscus lens and concave mirror being operable to rotate as part of the gyroscope rotor about the rotor axis, a field lens having a scanning pattern formed thereon carried by the meniscus lens at the focal plane of said lens and mirror system operable to chop rays received thereby which come through said transparent dome-shaped window, and a radiation responsive element carried by the gyroscope non-rotatable with the gyroscope rotor about the rotor axis of rotation, said radiation responsive element mounted on said gyroscope to tilt in all directions about the center of said gimbals and operable to receive the chopped rays.

2. A missile in accordance with claim 1 wherein the centers of curvature of the dome-shaped window and of the meniscus lens are coincident with said center.

References Cited in the file of this patent

UNITED STATES PATENTS

| 1,942,604 | Kennedy | Jan. 9, 1934 |
| 1,998,948 | Wittkuhns et al. | Apr. 23, 1935 |
| 2,369,622 | Toulon | Feb. 13, 1945 |
| 2,403,387 | McLennan | July 2, 1946 |
| 2,421,012 | Chew | May 27, 1947 |
| 2,421,085 | Rylsky | May 27, 1947 |
| 2,557,096 | Golay | June 19, 1951 |

FOREIGN PATENTS

| 430,237 | Italy | Feb. 12, 1948 |